Nov. 25, 1930. O. N. McCORMICK 1,783,127
FLOUR BIN FOR KITCHEN CABINETS
Filed Nov. 30, 1928
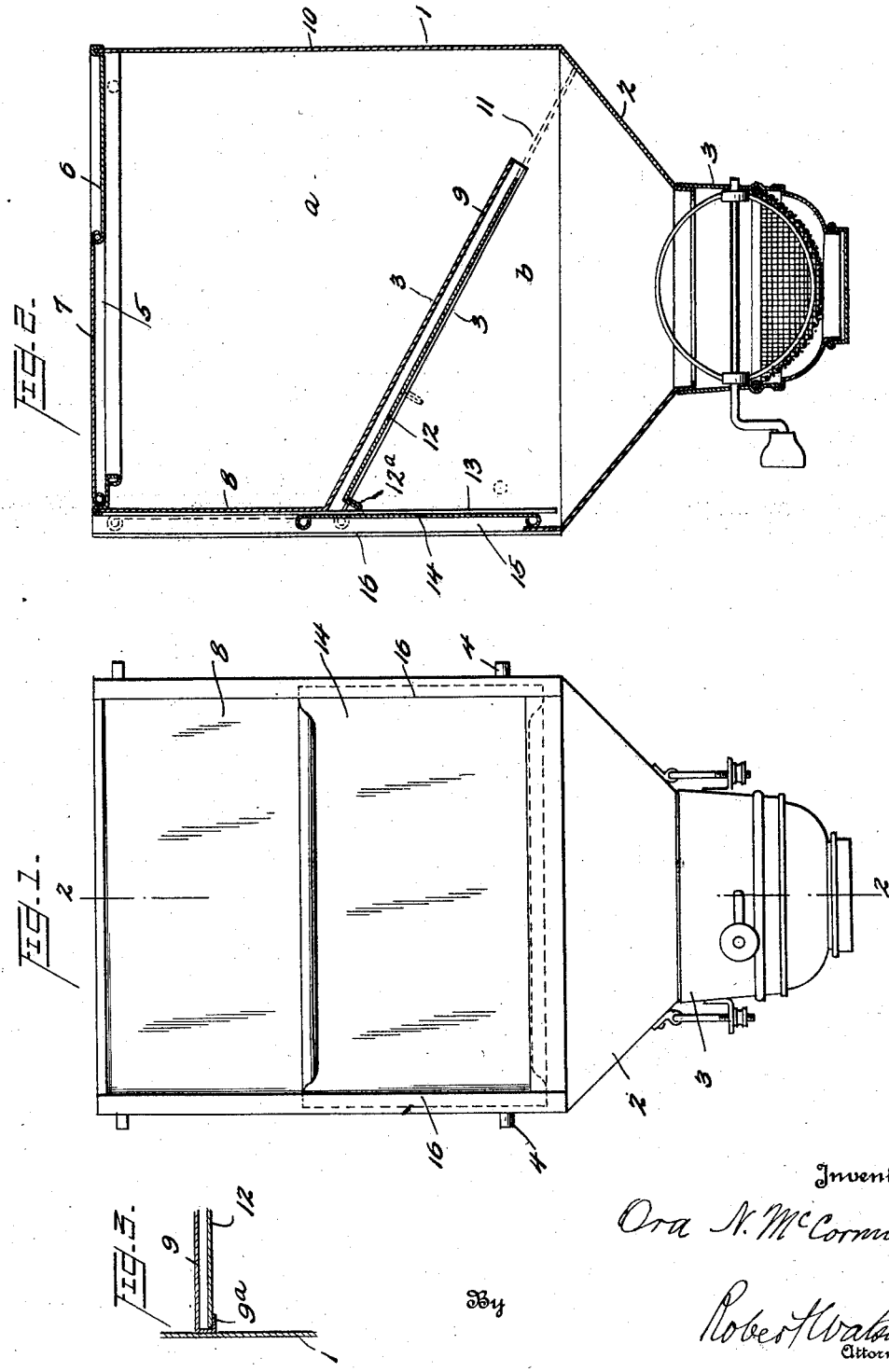
Inventor
Ora N. McCormick
By
Robert H Watson
Attorney Patented Nov. 25, 1930

1,783,127

UNITED STATES PATENT OFFICE

ORA N. McCORMICK, OF ALBANY, INDIANA, ASSIGNOR TO McCORMICK BROTHERS COMPANY, OF ALBANY, INDIANA

FLOUR BIN FOR KITCHEN CABINETS

Application filed November 30, 1928. Serial No. 322,780.

This invention relates to improvements in flour bins adapted for use in kitchen cabinets. The bin of the present invention comprises a casing divided into an upper storage compartment and a lower sifting compartment, the upper compartment having a filling opening at the top through which it can be filled with flour, and the lower compartment being separated from the upper one by a sloping partition having a valve-controlled opening. The filling compartment is accessible through an opening in the front of the casing, which is normally closed by a door, and the valve may be operated by raising the door and inserting the hand through this opening. A sifter is detachably connected to the lower end of the sifting compartment, and any desired amount of flour may be allowed to flow into this compartment by opening the valve. Thus, only the weight of the flour in the sifting compartment rests upon the sifter, and the latter can be operated more easily than if the weight of the entire amount of flour in the bin rested upon it. The opening in the front of the sifting compartment, in addition to affording access to the valve, enables the operator to remove any foreign substances which may be in the flour and which are screened out by the sifter. Also, if the operator sifts more flour than is necessary for his purpose, he may raise the sliding door on the front of the bin and throw the surplus sifted flour into the sifting compartment, so that it will be used at the next sifting operation; whereas, with the bins commonly in use, it is the practice to return the surplus sifted flour to the top of the bin, where it may mingle with freshly admitted flour, which is not desirable.

In the accompanying drawing,

Fig. 1 is a front elevation of the flour bin;

Fig. 2 is a section on the line 2—2 of Fig. 1; and,

Fig. 3 is a section on the line 3—3 of Fig. 2.

Referring to the drawing, the bin comprises a sheet metal casing 1, having a funnel-shaped bottom 2, to which is detachably connected a sifter 3. When arranged within a kitchen cabinet, the bin is supported on trunnions 4, projecting from the lower parts of its sides, and the bin may be rocked on these trunnions to swing its upper part far enough out of the cabinet to permit of the insertion of flour into the bin through a filling opening 5, in the top plate 6, which opening is normally closed by a hinged door 7.

The front plate 8 of the casing extends downwardly from the top plate for about half the height of the casing, and from the lower end of the front plate a partition 9 inclines downwardly and rearwardly within the casing and terminates above the funnel or hopper 2 and a short distance from the back plate 10, this partition dividing the casing into an upper storage compartment $a$, and a lower sifting compartment $b$, but leaving an opening 11, at its rear end, for the passage of flour from one compartment to the other. The partition plate 9 has its side edges turned under to form flanges $9^a$, as shown in Fig. 3, and a flat plate 12 is slidably mounted on these flanges and serves as a valve for opening and closing the passageway 11 between the two compartments. The valve plate is provided, at its front end, with a tongue or finger-piece $12^a$, which may be grasped to move the plate.

The front of the bin, below the partition, is open, and this opening 13 is normally closed by a door 14, which is slidable vertically in grooves 15, formed by flanging over the forward edges of the side plates of the casing, as shown at 16. This door may be raised to gain access to the sifting compartment.

In operation, when the bin is arranged within a kitchen cabinet, in order to fill the storage compartment $a$ with flour, the bin is pulled forward on its trunnions 4 and the door 7 is then opened and the flour is poured into the compartment through the filling opening 5. Of course, the slide valve 12 is closed before the flour is poured into the compartment. When it is desired to sift some of the flour, the door 14 is raised and the operator pulls the slide 12 toward the front of the bin, thereby permitting a suitable amount of the flour to flow from the storage compartment to the sifting compartment through the opening 11, and the valve 12 is then closed and also the door 14. The sifter may then be operated with only the weight of the flour in the sifting compartment resting upon it. If more flour is sifted out than is necessary for the immediate purpose, the operator may raise the door 14 and throw this excess flour back into the sifting compartment, so that this flour will pass out through the sifter at the next sifting operation. Because of its tendency to become musty, it is desirable to use the flour which has been in the bin for a time before using freshly admitted flour. It is customary, with the bins in ordinary use, to return the excess of sifted flour to the bin through its filling opening and in this way, after having passed through the bin it is returned to the top where it can mingle with freshly admitted flour, which is not desirable. If any foreign substances, such as wood splinters, accidentally get into the flour and pass into the sifting compartment $b$, these may be removed by inserting the hand through the door in front of the compartment, without the necessity of emptying the compartment by removal of the sifter. The sifter, of course, will be detached from time to time, to remove foreign particles which collect in the screen.

While the bin shown in the drawing is of the type having trunnions whereby it may be tilted in the cabinet, it will be understood that the improvements above described may be used in connection with various types of flour bins used in kitchen cabinets.

What I claim is:

1. A flour bin for kitchen cabinets comprising a casing having a partition therein, dividing it into upper and lower compartments, said partition having a passageway for permitting flour to pass from the former to the latter compartment, a valve for closing said passageway, the lower compartment having an opening at its front side, a door for closing said opening, and a sifter detachably connected to the bottom of the casing.

2. A flour bin for kitchen cabinets comprising a casing having a partition therein sloping from its front to its rear side and dividing it into upper and lower compartments, said partition having a passageway at its rear end for permitting flour to pass from the former to the latter compartment, a valve, slidable on said partition and accessible from the lower compartment, for closing said passageway, the lower compartment having an opening at its front side, a door for closing said opening, and a sifter detachably connected to the bottom of the casing.

In testimony whereof I affix my signature.

ORA N. McCORMICK.